(12) United States Patent
Lee (10) Patent No.: US 11,550,040 B2
(45) Date of Patent: Jan. 10, 2023

(54) LIDAR SYSTEM FOR VEHICLE AND OPERATING METHOD THEREOF

(71) Applicant: HYUNDAI AUTRON CO., LTD., Seoul (KR)

(72) Inventor: Chul Seung Lee, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 742 days.

(21) Appl. No.: 16/534,767

(22) Filed: Aug. 7, 2019

(65) Prior Publication Data

US 2020/0049802 A1 Feb. 13, 2020

(30) Foreign Application Priority Data

Aug. 13, 2018 (KR) .................. 10-2018-0094258

(51) Int. Cl.
*G01S 7/481* (2006.01)
*G05D 1/02* (2020.01)
*G01S 17/10* (2020.01)

(52) U.S. Cl.
CPC ............ *G01S 7/4818* (2013.01); *G01S 17/10* (2013.01); *G05D 1/0231* (2013.01); *G05D 2201/0213* (2013.01)

(58) Field of Classification Search
CPC ........ G01S 7/4818; G01S 17/10; G01S 7/003; G01S 17/931; G01S 17/08; G01S 7/484; G01S 7/486; G01S 7/4861; G05D 1/0231; G05D 2201/0213; G05D 1/024

See application file for complete search history.

(56) References Cited

U.S. PATENT DOCUMENTS

| | | | |
|---|---|---|---|
| 9,740,079 B1 | 8/2017 | Davids et al. | |
| 9,857,468 B1 * | 1/2018 | Eichenholz | ............. G01S 17/26 |
| 2018/0100929 A1 * | 4/2018 | O'Keeffe | .............. G01S 17/931 |
| 2018/0103303 A1 | 4/2018 | Schell | |

FOREIGN PATENT DOCUMENTS

| | | | |
|---|---|---|---|
| KR | 10-2001-0041181 A | | 5/2001 |
| KR | 20010041181 | * | 5/2001 |

OTHER PUBLICATIONS

KR20010041181A. NPL (Year: 2001).*
R.A. Perez-Herrera and M. Lopez-Amo, "Fiber optic sensor networks," *Optical Fiber Technology* 19:689-699 (2013).

* cited by examiner

Primary Examiner — Isam A Alsomiri
Assistant Examiner — Sanjida Naser
(74) Attorney, Agent, or Firm — Morgan, Lewis & Bockius LLP

(57) ABSTRACT

Disclosed is a light and detection ranging (LiDAR) system for a vehicle, which includes: a laser generator generating an optical signal having an address signal and a pulse signal; and a plurality of LiDAR sensors connected to an optical fiber bus, in which each of the plurality of LiDAR sensors determines whether the pulse signal of the optical signal is received according to the address signal of the optical signal.

15 Claims, 5 Drawing Sheets

LIDAR SYSTEM FOR VEHICLE AND OPERATING METHOD THEREOF

CROSS-REFERENCE TO RELATED APPLICATIONS

This application claims priority to and the benefit of Korean Patent Application No. 10-2018-0094258 filed in the Korean Intellectual Property Office on Aug. 13, 2018, the entire contents of which are incorporated herein by reference.

TECHNICAL FIELD

The present invention relates to a LiDAR system for a vehicle and an operating method thereof.

BACKGROUND ART

A light detection and ranging (LiDAR) sensor is technology that measures a distance by using a laser. The LiDAR is developed to a form in which geographical data for constructing 3D geographic information system (GIS) information is constructed and visualized. In recent years, the LiDAR has been applied to fields including construction, a national defense, and the like and in recent years, the LiDAR has been applied to autonomous vehicles and mobile robots. The LiDAR sensor is used for a range measurement sensor in the case of autonomous driving. The LiDAR sensor may emit a laser signal to a target and receive information on the target through reflection light reflected from the target.

SUMMARY OF THE INVENTION

The present invention has been made in an effort to provide a LiDAR system for a vehicle, which reduces the quantity of optical fibers used and an operating method thereof.

An exemplary embodiment of the present invention provides a light and detection ranging (LiDAR) system for a vehicle, which includes: a laser generator generating an optical signal having an address signal and a pulse signal; and a plurality of LiDAR sensors connected to an optical fiber bus, in which each of the plurality of LiDAR sensors determines whether the pulse signal of the optical signal is received according to the address signal of the optical signal.

In an exemplary embodiment, the optical signal is a laser signal having a single wavelength.

In an exemplary embodiment, each of the LiDAR sensors may include a first optical switch receiving the address signal through the optical fiber bus, and a second optical switch receiving the pulse signal through the optical fiber bus.

In an exemplary embodiment, each of the LiDAR sensors may further include a controller controlling on/off of the first and second optical switches.

In an exemplary embodiment, when the address signal is received, the controller turns on the first optical signal and turns off the second optical switch.

In an exemplary embodiment, when the pulse signal is received, the controller turns off the first optical signal and turns on the second optical switch.

In an exemplary embodiment, the LiDAR system further includes a receiver generating a corresponding electrical signal by receiving the address signal from the first optical switch, in which when the electrical signal is equal to an address of a corresponding LiDAR sensor, the controller turns off the first optical switch and turns on the second optical switch.

In an exemplary embodiment, the LiDAR may further include a scanner scanning the pulse signal received through the second optical switch to an external target object.

In an exemplary embodiment, the scanner transmits an optical signal reflected from the target object to a receiver.

In an exemplary embodiment, the optical signal output by the laser generator is broadcasted through the optical fiber bus.

Another exemplary embodiment of the present invention provides an operating method of a light and detection ranging (LiDAR) system for a vehicle, which includes: generating an optical signal having an address signal and a pulse signal by a laser generator; determining, by each of a plurality of LiDAR sensors, whether the address signal of the optical signal received through an optical fiber bus corresponds to an address of each of the plurality of LiDAR sensors; and receiving a pulse signal of the optical signal by a LiDAR sensor in which the address signal corresponds to the address of the LiDAR sensor.

In an exemplary embodiment, each of the plurality of LiDAR sensors may include a first optical switch receiving the address signal and a second optical switch receiving the pulse signal.

In an exemplary embodiment, the determining of whether the address signal corresponds to the address of each LiDAR sensor may further include: turning on the first optical switch, and turning off the second optical switch.

In an exemplary embodiment, the receiving of the pulse signal of the optical signal may further include: turning off the first optical switch, and turning on the second optical switch.

In an exemplary embodiment, the method may further include scanning the pulse signal of the optical signal received through the second optical switch to an external target object.

In an exemplary embodiment, the method may further include: receiving an optical signal reflected from the target object; and measuring a time difference between the received optical signal and the scanned optical signal.

In an exemplary embodiment, the method may further include: receiving an optical signal reflected from the target object; measuring the amount of change between the received optical signal and the scanned optical signal; and calculating a distance corresponding to the change amount.

In an exemplary embodiment, the change amount is at least one of a time difference, a phase difference, and a frequency difference.

According to exemplary embodiments of the present invention, in a LiDAR system for a vehicle and an operating method thereof, LiDAR sensors are connected and communicate through optical fiber buses to reduce the quantity of optical fibers used, which are required for constituting a LiDAR system, thereby reducing LiDAR system construction cost.

According to exemplary embodiments of the present invention, in a LiDAR system for a vehicle and an operating method thereof, the quantity of optical fibers required is reduced, thereby enhancing competitiveness of an automobile through reduction of system complexity and weight.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are to provide a further understanding of the exemplary embodiment, provide the exemplary embodiments together with the detailed description. It is to be understood, however, that technical features of the exemplary embodiment are not limited to specific drawings and features disclosed in the respective drawings may be combined with each other to constitute a new exemplary embodiment.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The contents of the present invention will be clearly and specifically disclosed so that those skilled in the art can easily carry out the present invention with reference to the following drawings.

The present invention may have various modifications and various embodiments and specific embodiments will be illustrated in the drawings and described in detail in the specification. However, this does not limit the present invention to specific exemplary embodiments, and it should be understood that the present invention covers all the modifications, equivalents and replacements included within the idea and technical scope of the present invention. Terms including as first, second, and the like are used for describing various constituent elements, but the constituent elements are not limited by the terms.

The terms are used to discriminate one constituent element from another component. For example, a first component may be referred to as a second component, and similarly, the second component may be referred to as the first component without departing from the scope of the present invention. It should be understood that, when it is described that a component is "connected to" or "accesses" another component, the component may be directly connected to or access the other component or a third component may be present therebetween. In contrast, it should be understood that, when it is described that a component is "directly connected to" or "directly accesses" another component, it is understood that no element is present between the element and another element.

Meanwhile, other expressions describing the relationship of the components, that is, expressions such as "between" and "directly between" or "adjacent to" and "directly adjacent to" should be similarly interpreted. Terms used in the present application are used only to describe specific exemplary embodiments, and are not intended to limit the present invention. A singular form may include a plural form if there is no clearly opposite meaning in the context.

In the present application, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance. If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Figure 1:
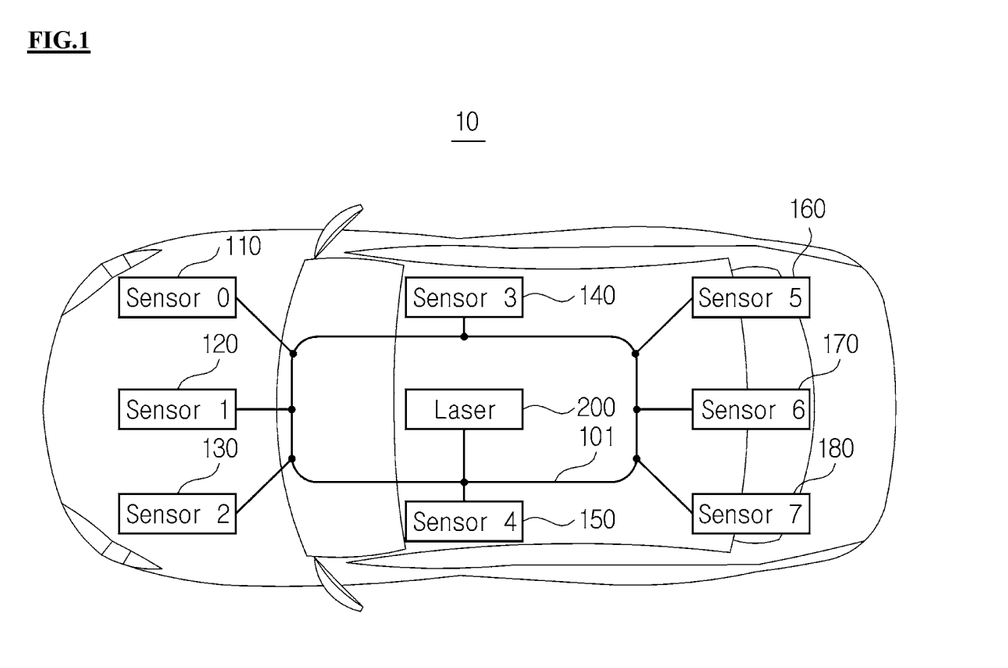
FIG. 1 is a diagram exemplarily illustrating a LiDAR system 10 for a vehicle according to an exemplary embodiment of the present invention.

FIG. 1 is a diagram exemplarily illustrating a LiDAR system 10 for a vehicle according to an exemplary embodiment of the present invention. Referring to FIG. 1, the LiDAR system 10 for a vehicle may include a plurality of LiDAR sensors 110 to 180 and a laser generator 200 embedded in a vehicle body.

In an exemplary embodiment, as illustrated in FIG. 1, three LiDAR sensors 110, 120, and 130 may be arranged in front of a vehicle, two Lidar sensors 140 and 150 may be arranged on the side of the vehicle, and three Lidar sensors 160, 170, and 180 may be arranged in the rear of the vehicle. Meanwhile, arrangement of the LiDAR sensors should be appreciated not to be limited thereto.

In an exemplary embodiment, each of the Lidar sensors 110 to 180 may receive an optical signal broadcast on one optic fiber bus 101. In an exemplary embodiment, the optical signal may include an address signal and a pulse signal. Here, the address signal is set to correspond to each of the LiDAR sensors 110 to 180 and the pulse signal may be data to be transferred. Each of the LiDAR sensors 110 to 800 may determine whether the optical signal received through the address signal is a signal of each LiDAR sensor and receive the pulse signal thereof.

In an exemplary embodiment, each of the LiDAR sensors 110 to 180 may measure a time difference between the output optical signal and the reflected optical signal, store time data corresponding to the measured time difference, and transmit the measured time data to a higher controller through a wired/wireless method.

The LiDAR system for the vehicle in the related art generates a light source having a desired wavelength by using a plurality of light source generators and transfers an optical signal having a specific wavelength to the optical fiber by using a separate distributor. The optical signal transferred through the optical fiber is output through a plurality of sensor heads provided in the LiDAR system and the output optical signal is reflected by an object. The reflected optical signal is used as an input of the sensor head again. A delay time up to the object on which the optical signal is reflected is measured by using the output optical signal and the received optical signal. Since the distributor is used, the optical fiber for each sensor head is required.

On the other hand, the LiDAR system 10 for the vehicle according to an exemplary embodiment of the present invention connects the laser generator 200 and the LiDAR sensors 110 to 180 to a single optical fiber bus 101 in order to reduce the quantity of optical fibers used when the plurality of sensor heads is used. The address signal may be allocated to distinguish the optical signals generated through the laser generator 200 for each sensor head and the sensor head may be selected according to the corresponding address value. As a result, the LiDAR system 10 for the vehicle according to an exemplary embodiment of the present invention transmits and receives the optical signals from the plurality of LiDAR sensors 110 to 180 through one optical fiber, and as a result, the quantity of optical fibers used is greatly reduced and the distributor need not be used.

Figure 2:
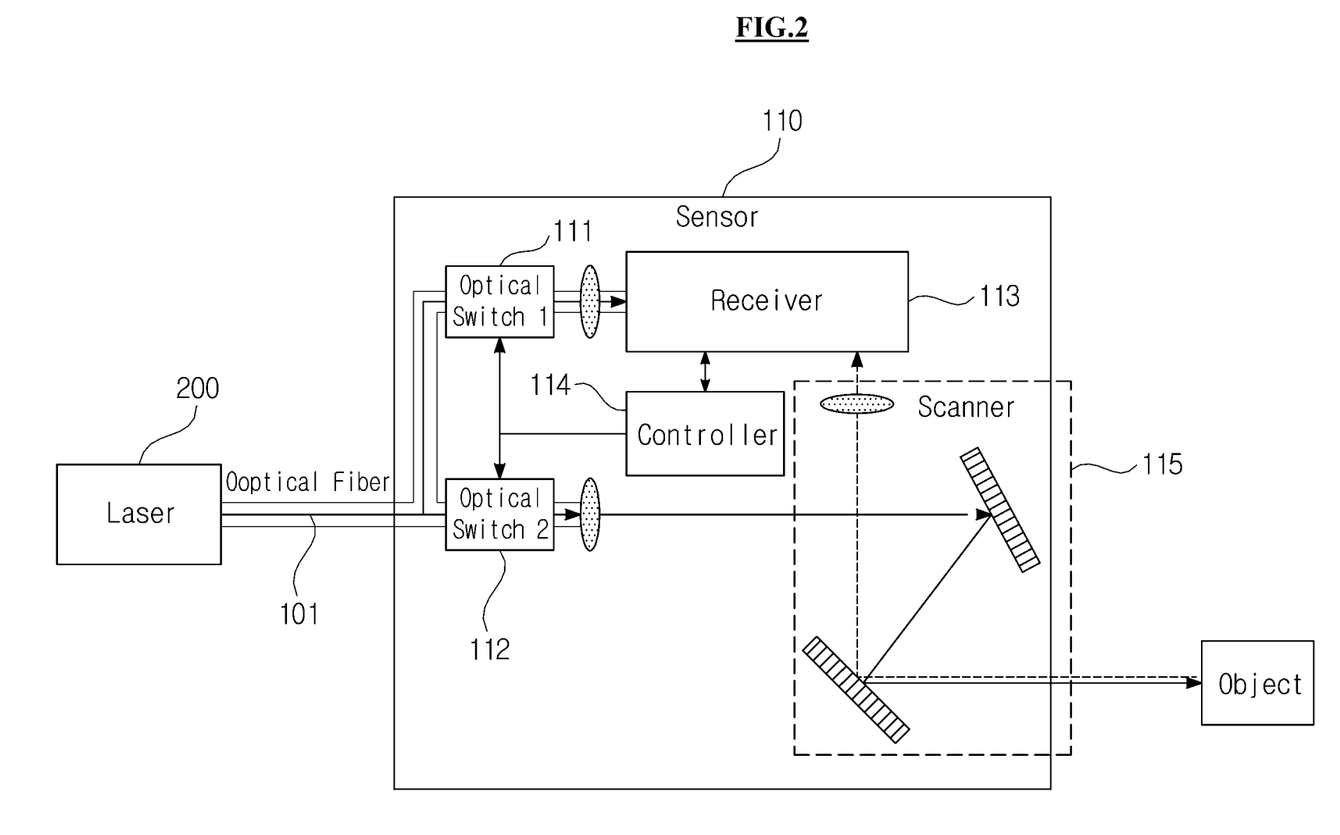
FIG. 2 is a diagram exemplarily illustrating a LiDAR sensor 110 according to an exemplary embodiment of the present invention.

FIG. 2 is a diagram exemplarily illustrating a LiDAR sensor 110 according to an exemplary embodiment of the present invention. Referring to FIG. 2, the Lidar sensor 110 may include a first optical switch 111, a second optical switch 112, a receiver 113, a controller 114, and a scanner 115.

The first optical switch 111 may be implemented to receive the address signal of the optical signal transferred from the optical fiber 101. The first optical switch 111 may be turned on/off by the controller 114.

The second optical switch 112 may be implemented to receive the pulse signal of the optical signal transferred from the optical fiber 101. The second optical switch 112 may be turned on/off by the controller 114.

The receiver 113 may be implemented to convert the optical signal received from the first optical switch 111 into an electrical signal. That is, the receiver 113 may generate the electrical signal corresponding to the optical signal. In an exemplary embodiment, the receiver 113 may generate a current pulse or a voltage pulse as the electrical signal. In another exemplary embodiment, the receiver 113 may include at least one photodiode or a single photon diode.

The controller 114 may be implemented to receive a signal acquired by converting the address signal from the receiver 113 and determine whether the received address signal corresponds to an address of the LiDAR sensor 110. Further, the controller 114 may be implemented to turn off the first optical switch 111 and turn on the second optical switch 112 when the received address signal corresponds to the address of the LiDAR sensor 110.

Further, the controller 114 may be implemented to measure the amount of change between the pulse signal of the optical signal transmitted to a target object through the scanner 115 and the pulse signal of the optical signal reflected from the target object and store time information corresponding to the measured amount of change. In an exemplary embodiment, such a change amount may be a time difference, a phase difference, a frequency difference, or the like.

The scanner 115 may be implemented to receive the pulse signal of the optical signal received from the second optical switch 112 and transmit the pulse signal to the target object. Further, the scanner 115 may be implemented to receive the optical signal reflected from the target object.

In an exemplary embodiment, the scanner 115 may be adjusted to scan the optical signal in one or more directions. As illustrated in FIG. 2, the scanner 115 may include a first mirror and a second mirror. Here, the first mirror may direct the optical signal to the second mirror. Meanwhile, the scanner 115 may be referred to as a beam scanner, an optical scanner, or a laser scanner.

Figure 3:
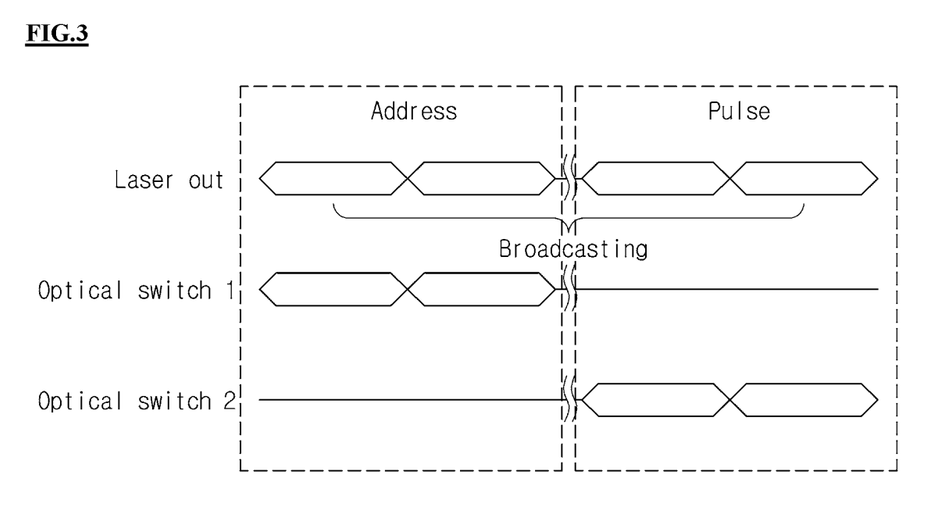
FIG. 3 is a diagram exemplarily illustrating an optical switch operation of a LiDAR sensor according to an exemplary embodiment of the present invention.

FIG. 3 is a diagram exemplarily illustrating an optical switch operation of a LiDAR sensor according to an exemplary embodiment of the present invention. An optical switch operation may be distinguished according to the information on the optical signal received through the optical switch. As illustrated in FIG. 3, in the address signal, Optical Switch 1 is in an "on" state and Optical Switch 2 is in an "off" state. Optical Switch 1 may be transited to the "off" state and Optical Switch 2 may be transited to "on" state if values of the address of the Lidar sensor and the address signal which correspond to each other are equal to each other. In such a transition state, the corresponding LiDAR sensor waits for a pulse to be input later and may return to the state of the address signal when the pulse reception and the external output are completed.

In an exemplary embodiment, a predetermined time may be included between the address signal and the pulse signal.

Meanwhile, the laser generator 200 illustrated in FIG. 1 generates a laser signal having a single wavelength. However, it should be understood that the laser generator of the present invention is not particularly limited thereto. The laser generator of the present invention may include a plurality of lasers having wavelengths corresponding to the LiDAR sensors, respectively.

Figure 4:
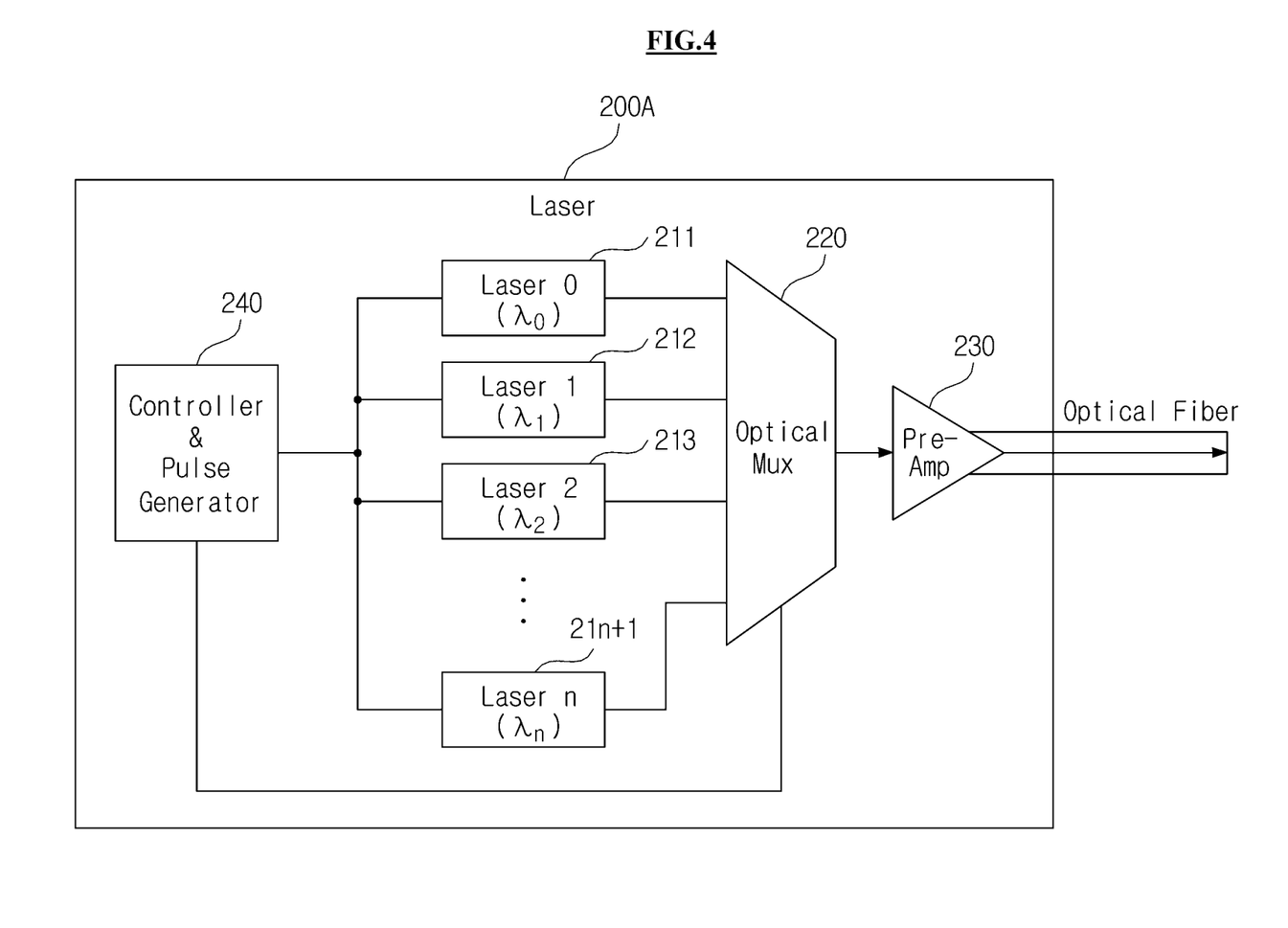
FIG. 4 is a diagram exemplarily illustrating a laser generator 200A according to an exemplary embodiment of the present invention.

FIG. 4 is a diagram exemplarily illustrating a laser generator 200A according to an exemplary embodiment of the present invention. Referring to FIG. 4, the laser generator 200A may include a plurality of lasers 211, 212, 213, . . . , 21$n$+1, an optical multiplexer 220, a preamplifier 230, a controller and pulse generator 240.

Each of the plurality of lasers 211, 212, 213, . . . , 21$n$+1 may be implemented to receive the pulse and generate laser signals $\lambda_0, \ldots, \lambda_n$ having the wavelengths corresponding to the LiDAR sensors.

The optical multiplexer 220 may be implemented to select any one of the plurality of laser signals $\lambda_0, \ldots, \lambda_n$ according to the control by the controller 240.

The preamplifier 230 may be implemented to amplify the laser signal selected by the optical multiplexer 220.

The controller and pulse generator 240 may be implemented to control an overall operation of the laser generator 200A. The controller and pulse generator 240 may generate the pulse signal.

Figure 5:
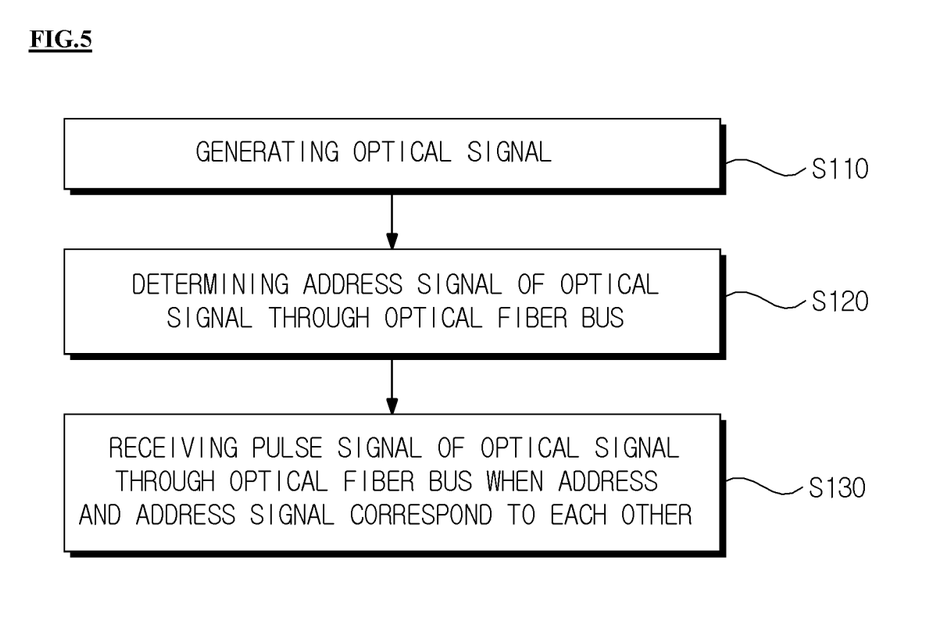
FIG. 5 is a flowchart exemplarily illustrating an operating method of a LiDAR system 10 for a vehicle according to an exemplary embodiment of the present invention.

FIG. 5 is a flowchart exemplarily illustrating an operating method of a LiDAR system 10 for a vehicle according to an exemplary embodiment of the present invention. Referring to FIGS. 1 to 5, an operating method of the LiDAR system 10 for the vehicle may be performed as follows.

The laser generator 200 (see FIG. 1) may generate the optical signal. Here, the optical signal may include the address signal and the pulse signal (S110). The generated optical signal may be broadcasted to the plurality of LiDAR sensors 110 to 180 through the optical fiber bus 101 (see FIG. 1). Each of the LiDAR sensors 110 to 180 may determine whether the address signal of the optical signal transmitted through the optical fiber bus 101 corresponds to the address of each of the LiDAR sensors 110 to 180 (S120). When the address signal of the optical signal corresponds to the address of each LiDAR sensor, the pulse signal of the optical signal may be received by the corresponding LiDAR sensor (S130). The received pulse signal of the optical signal may be then transmitted to an external target object.

The steps and/or operations according to the present invention may occur in different orders, in parallel, or concurrently in other exemplary embodiments for other epochs or the like, as may be understood by those skilled in the art.

Depending on the exemplary embodiment, at least some among some or all of the steps and/or operations may be implemented or performed by using commands, programs, and interactive data structures server stored in one or more non-transitory computer-readable media, and one or more processors driving a client and/or a server. The one or more non-transitory computer-readable media may be, by way of example, software, firmware, hardware, and/or any combination thereof. Further, the functions of the "module" discussed in this specification may be implemented by software, firmware, hardware, and/or any combination thereof.

One or more non-transitory computer-readable media and/or means for implementing/performing one or more operations/steps/modules of exemplary embodiments of the present invention may include application-specific integrated circuits (ASICs), standard integrated circuits, controllers and/or embedded controllers performing appropriate commands, which include a microcontroller, field-programmable gate arrays (FPGAs), complex programmable logic devices (CPLDs), and devices equivalent thereto, but are not limited thereto.

In the LiDAR system for the vehicle according to an exemplary embodiment of the present invention, a plurality of LiDAR sensors which exists in the automobile is separated into a transmission unit and a reception unit to be integrated into the transmission unit and the transmission unit and the reception unit may be connected by the optical fiber. Further, the LiDAR system for the vehicle according to an exemplary embodiment of the present invention is divided by address allocation through a single optical fiber without using an optical fiber distributor required at the time of using the transmission unit, thereby reducing LiDAR system cost.

According to exemplary embodiments of the present invention, in a LiDAR system for a vehicle and an operating method thereof, LiDAR sensor modules may be connected and communicated through the optical fiber bus. As a result, the quantity of optical fibers required is reduced, thereby reducing LiDAR system construction cost. The quantity of optical fibers required is reduced, thereby enhancing competitiveness of the automobile through reduction of system complexity and weight.

Meanwhile, the above-described contents of the present invention are only specific exemplary embodiments for carrying out the invention. The present invention will include not only concrete and practical means themselves, but also technical ideas which are abstract and conceptual ideas that can be utilized as future technologies.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A light and detection ranging (LiDAR) system for a vehicle, comprising:
    a laser generator generating an optical signal having an address signal and a pulse signal; and
    a plurality of LiDAR sensors connected to an optical fiber bus,
    wherein each of the plurality of LiDAR sensors determines whether the pulse signal of the optical signal is received according to the address signal of the optical signal,
    wherein each of the LiDAR sensors includes
        a first optical switch receiving the address signal through the optical fiber bus, and
        a second optical switch receiving the pulse signal through the optical fiber bus.

2. The LiDAR system of claim 1, wherein the optical signal is a laser signal having a single wavelength.

3. The LiDAR system of claim 1, wherein each of the LiDAR sensors further includes a controller controlling on/off of the first and second optical switches.

4. The LiDAR system of claim 3, wherein when the address signal is received, the controller turns on the first optical switch and turns off the second optical switch.

5. The LiDAR system of claim 3, wherein when the pulse signal is received, the controller turns off the first optical signal and turns on the second optical switch.

6. The LiDAR system of claim 3, further comprising:
    a receiver generating a corresponding electrical signal by receiving the address signal from the first optical switch,
    wherein when the electrical signal is equal to an address of a corresponding LiDAR sensor, the controller turns off the first optical switch and turns on the second optical switch.

7. The LiDAR system of claim 1, further comprising:
    a scanner scanning the pulse signal received through the second optical switch to an external target object.

8. The LiDAR system of claim 7, wherein the scanner transmits an optical signal reflected from the target object to a receiver.

9. The LiDAR system of claim 1, wherein the optical signal output by the laser generator is broadcasted through the optical fiber bus.

10. An operating method of a light and detection ranging (LiDAR) system for a vehicle, the operating method comprising:
    generating an optical signal having an address signal and a pulse signal by a laser generator;
    determining, by each of a plurality of LiDAR sensors, whether the address signal of the optical signal received through an optical fiber bus corresponds to an address of each of the plurality of LiDAR sensors; and
    receiving a pulse signal of the optical signal by a LiDAR sensor in which the address signal corresponds to the address of the LiDAR sensor,
    wherein each of the plurality of LiDAR sensors includes
        a first optical switch receiving the address signal, and
        a second optical switch receiving the pulse signal.

11. The operating method of claim 10, wherein the determining of whether the address signal corresponds to the address of each LiDAR sensor further includes turning on the first optical switch, and
turning off the second optical switch.

12. The operating method of claim 10, wherein the receiving of the pulse signal of the optical signal further includes
turning off the first optical switch, and
turning on the second optical switch.

13. The operating method of claim 10, further comprising:
scanning the pulse signal of the optical signal received through the second optical switch to an external target object.

14. The operating method of claim 13, further comprising:
receiving an optical signal reflected from the target object;
measuring the amount of change between the received optical signal and the scanned optical signal; and
calculating a distance corresponding to the change amount.

15. The operating method of claim 14, wherein the change amount is at least one of a time difference, a phase difference, and a frequency difference.

* * * * *